United States Patent
Budd et al.

(10) Patent No.: US 10,488,605 B1
(45) Date of Patent: Nov. 26, 2019

(54) PHOTONIC WAVEGUIDE COUPLING USING OFFSET LIGHT SOURCE

(71) Applicant: International Business Machines Corporation, Armonk, NY (US)

(72) Inventors: Russell Budd, North Salem, NY (US); Marc A. Taubenblatt, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/059,663

(22) Filed: Aug. 9, 2018

(51) Int. Cl.
*G02B 6/42* (2006.01)
*G02B 6/43* (2006.01)
*G02B 6/30* (2006.01)

(52) U.S. Cl.
CPC .......... *G02B 6/4204* (2013.01); *G02B 6/425* (2013.01); *G02B 6/4296* (2013.01); *G02B 6/43* (2013.01); *G02B 6/30* (2013.01)

(58) Field of Classification Search
None
See application file for complete search history.

(56) References Cited

U.S. PATENT DOCUMENTS

| | | | |
|---|---|---|---|
| 5,299,045 A * | 3/1994 | Sekiguchi | G02B 6/12007 385/10 |
| 8,772,704 B2 | 7/2014 | Mack et al. | |
| 9,507,111 B2 | 11/2016 | Collins et al. | |
| 9,612,401 B2 | 4/2017 | Rankel et al. | |
| 9,813,161 B2 | 11/2017 | Peterson et al. | |
| 2013/0336664 A1 | 12/2013 | Mack et al. | |
| 2014/0153605 A1 * | 6/2014 | Arimoto | H01S 5/12 372/50.11 |
| 2015/0205062 A1 | 7/2015 | Collins et al. | |
| 2016/0238793 A1 | 8/2016 | Frankel et al. | |
| 2016/0277115 A1 | 9/2016 | Peterson et al. | |

OTHER PUBLICATIONS

Lin, C.-K, et al., "High-Speed 985 nm Bottom-Emitting VCSEL Arrays for Chip-to-Chip Parallel Optical Interconnects", IEEE Journal of Selected Topics in Quantum Electronics, Sep./Oct. 2007, pp. 1332-1339, vol. 13, No. 5.

Zhang, X., et al., "Power scaling and beam divergence compression of bottom-emitting vertical-cavity surface-emitting lasers", Proceedings of SPIE, International Symposium on Photoelectronic Detection and Imaging 2013: High Power Lasers and Applications, Sep. 17, 2013, pp. 89040D-1-89040D-12, vol. 8904.

Wang, B., "Fujitsu Laboratories Develops Compact Silicon Photonics Light Source for High-Bandwidth CPU Interconnects", https://www.nextbigfuture.com/2011/09/fujitsu-laboratories-develops-compact.html, Sep. 18, 2011, 7 pages.

* cited by examiner

*Primary Examiner* — Jerry Rahll
(74) *Attorney, Agent, or Firm* — Scully, Scott, Murphy & Presser, PC; Daniel P. Morris, Esq.

(57) ABSTRACT

A structure to couple light to a waveguide is described. In an example, a light source of the structure may emit light from an emission point towards a lens of the structure. The light source may be disposed at a location such that the emission point of the light source is offset from a center of the lens. The lens may be integrated in a substrate of a structure comprising the light source. The lens may refract the light emitted from the emission point at an angle. The angle may be based on the offset between the emission point and the center of the lens. The structure may couple the refracted light to a coupler of the waveguide at an incident angle.

18 Claims, 4 Drawing Sheets

US 10,488,605 B1

PHOTONIC WAVEGUIDE COUPLING USING OFFSET LIGHT SOURCE

FIELD

The present application relates generally to design and implementation of optoelectronic components.

BACKGROUND

The performance of high end computers systems continues to improve as the number of processing cores, and their speed, are increased. Improvements in system interconnect bandwidth can meet increased networking needs. Integration of photonics with electronics provides a solution to achieve this desired bandwidth during data transmission among the processor cores. Silicon photonic chips include both electronic and optical components on a single integrated chip. Various components may be utilized, integrated, or embedded on the silicon photonic chips to enable optical signal coupling between the silicon photonic chips and standard optical fibers.

SUMMARY

In some examples, a structure effective to couple light to a waveguide is generally described. The structure may include a lens integrated in a substrate. The structure may further include a light source operable to emit light from an emission point towards the lens. The light source may be disposed at a location in which the emission point is offset from a center of the lens. The offset of the emission point from the center of the lens may cause the light emitted from the light source to refract at an angle to direct the light towards a coupler of a waveguide and to couple the light to the waveguide at an incident angle.

In some examples, a structure effective to convert light into electric current is generally described. The structure may comprise a lens integrated in a substrate and a light detector operable to absorb light. The light detector may be disposed at a location in which a center of the light detector is offset from a center of the lens. The lens may be disposed between the light detector and a waveguide coupler. The lens may be operable to direct the light exiting the waveguide coupler towards the center of the light detector. The light detector may be further operable to absorb the light focused by the lens, and may convert the absorbed light into electric current.

In some examples, a device effective to modulate an electrical signal is generally described. The device may include a modulator. The device may further include a circuit configured to receive an electrical signal. The circuit may further be configured to send the electrical signal to the modulator. The device may further include a waveguide comprising a coupler. The device may further include a structure comprising a lens and a light source. The lens may be integrated in a substrate. The light source may be operable to emit light from an emission point towards the lens. The light source may be disposed at a location where the emission point is offset from a center of the lens. The offset of the emission point from the center of the lens causes the light emitted from the light source to refract at an angle to direct the light towards the coupler of the waveguide and to couple the light to the waveguide at an incident angle. The waveguide may be effective to direct the coupled light to the modulator. The modulator may be configured to modulate the electrical signal with the light received from the waveguide.

Further features as well as the structure and operation of various embodiments are described in detail below with reference to the accompanying drawings. In the drawings, like reference numbers indicate identical or functionally similar elements.

DETAILED DESCRIPTION

As the desired bandwidth increases, the complexity of electro-optical packages that support the projected bandwidth and the number of assembly steps of such electro-optical packages also increases. Future high density silicon photonic optical transceivers packaged close to the processor or switch chips may facilitate tremendous off-module bandwidth. Some example silicon photonics transceivers may use distributed feedback (DFB) lasers with Mach-Zehnder modulators, but may consume a significant amount of power. The design and implementation in accordance with the present disclosure introduces a structure that may be relatively simple, low cost and uses efficient laser light source that may be easily modulated.

Figure 1:
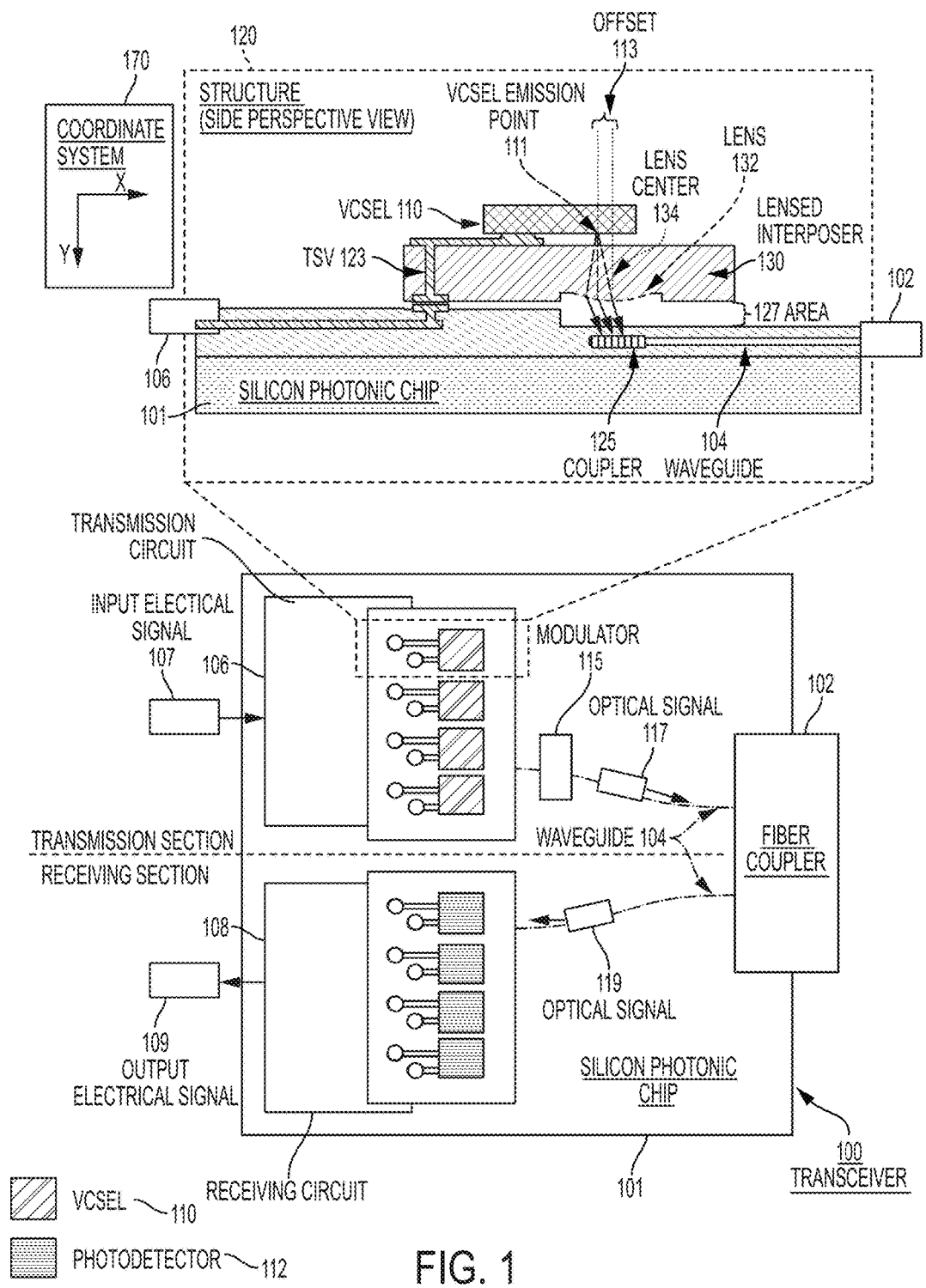
FIG. 1 illustrates an example structure that facilitates photonic waveguide coupling using offset light source in one embodiment.

FIG. 1 illustrates an example structure 120 that may facilitate photonic waveguide coupling using offset light source, arranged in accordance with at least some embodiments described herein. In some examples, the structure 120 may facilitate photonic waveguide coupling during operations of a devices that include the structure 120, such as an optical transceiver ("transceiver") 100 shown in FIG. 1.

In an example, the transceiver 100 may include a transmission section and a receiving section. The transceiver 100 may include a silicon photonics chip 101, and may include one or more components integrated and/or embedded in the silicon photonics chip 101. The transmission section of the transceiver may include a transmission circuit 106, an array of light sources, such as a vertical-cavity surface-emitting laser (VCSEL) array including at least one VCSEL 110, and in some cases, a modulator 115. In some examples, the VCSEL 110 may be a single mode VCSEL. The receiving section may include a receiving circuit 108 and a photodetector array including at least one photodetector 112. The transmission section and the receiving section may be connected to a fiber coupler 102 via at least one waveguide 104. The waveguide 104 may be an optical waveguide, containing a silicon nitride waveguide core with an optical index of 2.0 surrounded by a silicon dioxide cladding with an optical index of 1.45. In some examples, the waveguide 104 may be a single mode waveguide. The fiber coupler 102 may be an off-chip fiber coupler, or a fiber-to-chip coupler, that couples the waveguide 104 to fibers or waveguides that are not part of the transceiver 100. For example, if the transceiver 100 is a component of a computer system, the fiber coupler 102 may couple the waveguide 104 of the transceiver to fibers connecting the transceiver 100 with a central processing unit (CPU), graphics processing unit (GPU), and/or other components of the computer system. In some examples, the modulator 115 may not be a part of the transceiver 100 and the electrical signal 107 may directly modulate an output of the VCSEL 110.

An example operation of the transceiver 100 may include receiving an input electrical signal 107 (such as, from another component of the computer system) at the transmission circuit 106. The electrical signal 107 may flow through the transmission circuit 106 towards a modulator 115. Each VCSEL 110 among the VCSEL array may emit light, which may be coupled onto waveguide 104, to be directed to the modulator 115. The modulator 115 may modulate the electrical signal 107 with the light emitted from the VCSEL 110 to generate an optical signal 117. The optical signal 117 may flow through the waveguide 104 and may be transmitted to other components of the computer device through the fiber coupler 102.

The operation of the transceiver 100 may also include receiving an optical signal 119 at the receiving section, where the photodetector 112 may detect the optical signal 119 and may convert the optical signal 119 into an output electrical signal 109.

During the operation of the transmission section of the transceiver 100, the light emitted from the VCSEL 110 may be coupled to the waveguide 104 in order for the light to be directed to the modulator 115 for modulation of the electrical signal 107. In order to couple the light emitted from the VCSEL 110 onto waveguide 104, the VCSEL 110 may be arranged at a particular location, with respect to other components (e.g., a lens 132), to cause the emitted light to couple on a coupler 125 of the waveguide 104 at a desirable incident angle. In some examples, the coupler 125 may be a waveguide grating coupler, and/or other types of couplers.

As shown by a side perspective view of the structure 120, the waveguide 104 may be mounted above, or embedded on, the silicon photonics chip 101. A lensed interposer 130 may be positioned above a portion of the waveguide 104, and may be separated from the waveguide 104 by an area 127. The area 127 may be filled with air or index matching materials. The lensed interposer 130 may be a layer of substrate, such as silicon, glass, III-V materials (compound with at least one Boron group, or group III, element and at least one Nitrogen group, or group V, element), molded plastic, and/or other materials. The lens 132 may be integrated in the lensed interposer 130. In some examples, the lens 132 may be a convex lens. In some examples, the lens 132 may be integrated in the lensed interposer 130 as part of a lens array or microlens array. In some examples, the lensed interposer 130 may be a complementary metal-oxide-semiconductor (CMOS) chip or a silicon-germanium chip that includes VCSEL drive circuitry and/or lens array (that includes the lens 132).

The VCSEL 110 may be mounted above the lensed interposer 130, and disposed at a location where a lens center 134 of the lens 132 may be offset from a VCSEL emission point 111, in the x-direction indicated by a coordinate system 170, by an offset 113. In some examples, the VCSEL emission point 111 may be offset from the lens center 134 but may be positioned within a diameter of the lens 132 in the x-direction. The VCSEL emission point 111 may be a point on the VCSEL 110 that emits light in the y-direction indicated by the coordinate system 170, and the lens center 134 of the lens 132 may be a center of the lens 132. In some examples, the VCSEL 110 may be flip-chip mounted on the lensed interposer 130, such that the VCSEL 110 may emit light from the emission point 111 in the y-direction, at a normal angle with respect to the VCSEL 110, towards the lens 132. By offsetting the lens center 134 from the VCSEL emission point 111 in the x-direction, light emitted from the VCSEL emission point 111 in the y-direction may incident on a portion, or a point, of the lens 132, at a normal angle to the portion of the lens 132, where the point may be outside of the lens center 134. As such, the emitted light being incident on the point outside of the lens center 134 may be collimated and refracted by the lens 132 at an off-normal refraction angle from the lens 132. In some examples, the VCSEL 110 may be bonded to the transmission circuit 106 through a through-silicon via (TSV) 123.

The lens 132 may refract and/or collimate the light emitted from the VCSEL 110 such that the light emitted from the VCSEL 110 may be directed towards the coupler 125 at an incident angle. The incident angle may be an off-normal angle. In some examples, the incident angle may be based on a distance between the VCSEL emission point 111 and the lens center 134 (e.g., offset 113) in the x-direction, a thickness of the lensed interposer 130, attributes of the lens 132 (e.g., thickness, radius, diameter, shape, curvature, aperture, material), and/or other attributes associated with the VCSEL 110, the light emitted from the VCSEL 110, and/or the lens 132. By coupling the emitted light onto the waveguide 104 at a desirable incident angle, an amount of energy loss may be minimized. For example, the structure 120 may facilitate coupling of light onto the waveguide 104 at an incident angle ranging between 2 to 10 degrees, and in some examples, may achieve a coupling efficiency greater than 80% (−1 dB loss). The offset 113 between the lens center 134 and the VCSEL emission point 111 may be within a range of distance values that achieves the desirable incident angle of 2 to 10 degrees. In some examples, the thickness of the lensed interposer 130 may range from 0.1 millimeter (mm) to 4 mm, and sometimes more than 4 mm. A lensed interposer 130 center thickness of 2 mm and an offset 113 of 0.2 mm may result in an incident angle of 6 degrees, within the desired 2 to 10 degree range.

Figure 2:
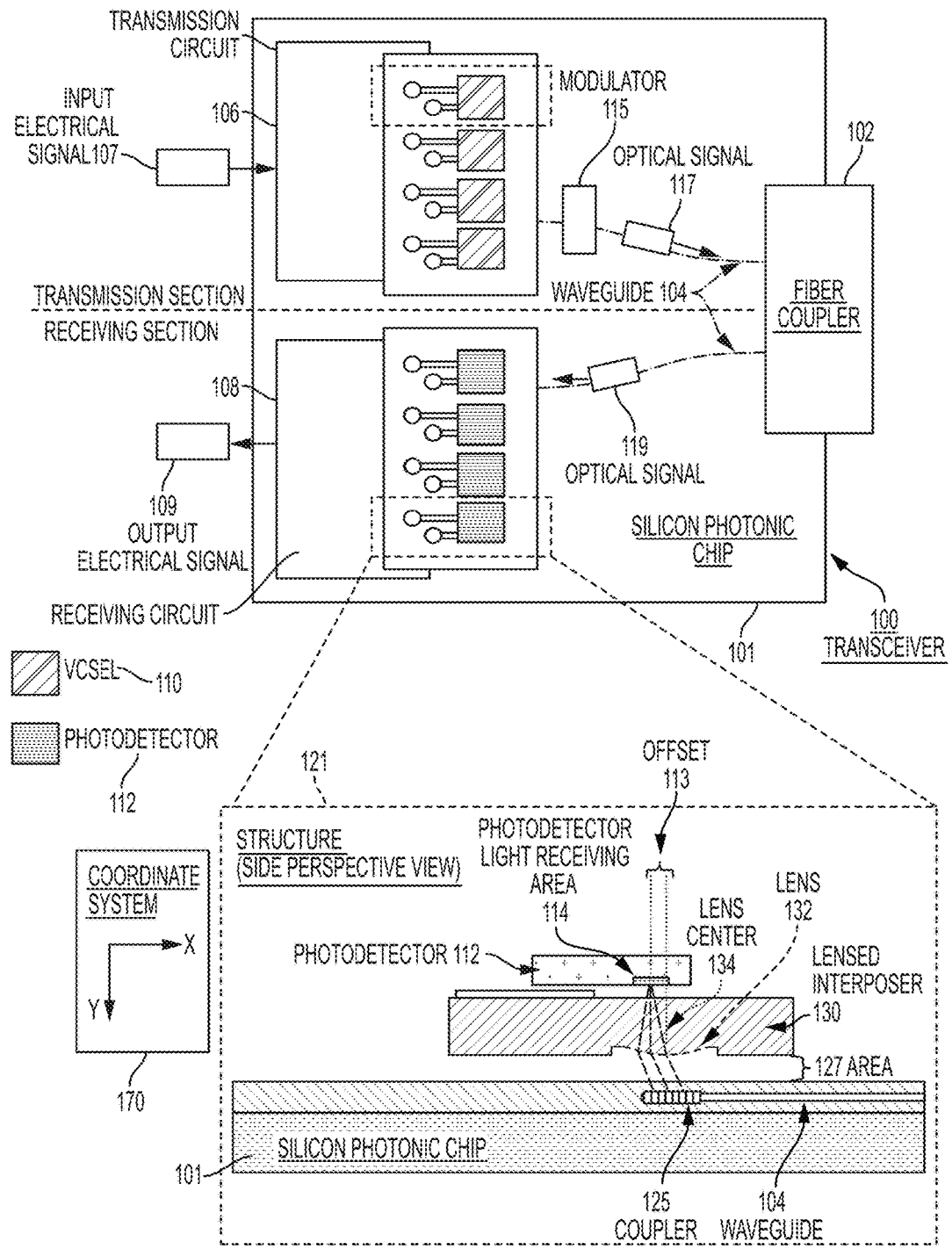
FIG. 2 illustrates an example structure that is a component of a transceiver shown in FIG. 1 in one embodiment.

FIG. 2 illustrates an example structure 121 that may be a component of the transceiver 100 shown in FIG. 1, arranged in accordance with at least some embodiments described herein. Components in FIG. 2 that are labeled identically to components of FIG. 1 are not described again for the purposes of clarity. FIG. 2 is described with references to the above descriptions of FIG. 1.

The operation of the transceiver 100 may also include receiving an optical signal 119 at the receiving section, where the photodetector 112 may detect the optical signal 119 and may convert the optical signal 119 into an output electrical signal 109. The array of photodetectors 112 may include light detectors such as photodiodes. The optical signal 119 may flow through the waveguide 104, and each photodetector 112 may absorb light photons in the optical signal 119 from the waveguide 104 and via the coupler 125 and lens 132. Each photodetector 112 among the photodetector array may convert the received light photons into current, which may be outputted as the output electrical signal 109. Each photodetector 112 may be arranged at a particular location, with respect to other components (e.g., a lens 132), to accept the light from the waveguide 104 which leaves the coupler 125 at a desirable exit angle. The light that exited the coupler 125 may be focused by the lens 132, such that the light may be directed towards the photodetector light receiving area 114.

As shown by a side perspective view of the structure 121, similar to the configuration of structure 120, the photodetector 112 may be mounted above the lensed interposer 130, and disposed at a location where the lens center 134 of the lens 132 may be offset from a center of the photodetector light receiving area 114, in the x-direction indicated by the coordinate system 170, by the offset 113. By offsetting the lens center 134 from the center of the photodetector light receiving area 114, light exiting the coupler 125 may reach the photodetector light receiving area 114 via a same path as the light that was emitted from the VCSEL 110 in the structure 120, but in an opposite direction. As such, an optimal amount of light may be absorbed by the photodetector light receiving area 114 given that the light exits the coupler 125 at an angle. In some examples, a transimpedance amplifier (TIA) circuit may be integrated into the lensed interposer 130 to amplify the signals received at the photodetectors 112.

Figure 3:
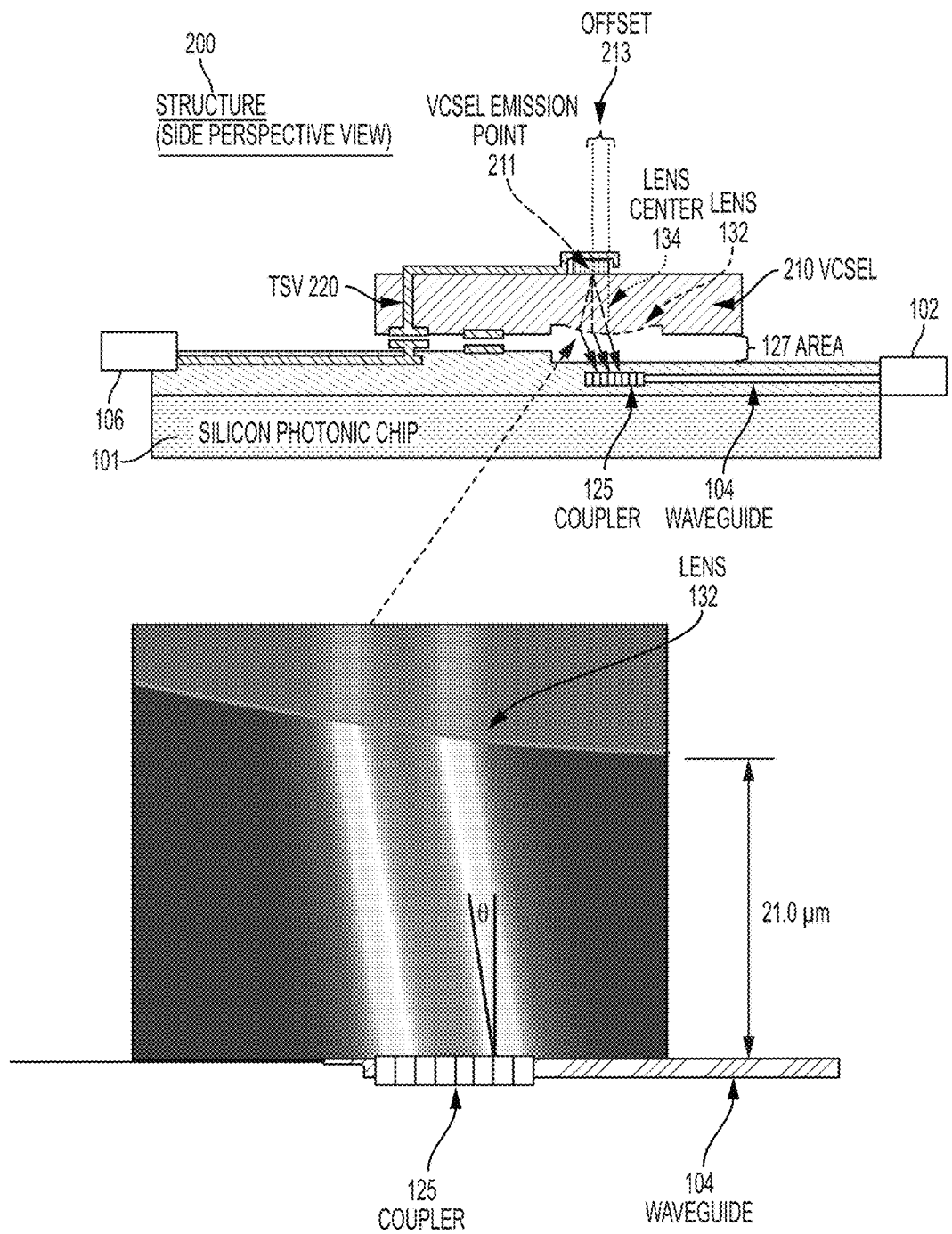
FIG. 3 illustrates an example arrangement of elements in photonic waveguide coupling using offset light source in one embodiment.

FIG. 3 illustrates an example implementation of photonic waveguide coupling using offset light source, arranged in accordance with at least some embodiments described herein. Components in FIG. 3 that are labeled identically to components of FIGS. 1-2 are not described again for the purposes of clarity. FIG. 3 is described with references to the above descriptions of FIGS. 1-2.

In an example embodiment, a structure 200 may facilitate photonic waveguide coupling in accordance with the present disclosure. In an example, the structure 200 may be a part of the VCSEL array of the transceiver 100. As shown in a side perspective view of the structure 200 in FIG. 3, the lens 132 may be integrated in a VCSEL 210, where the VCSEL 210 may be a backside emitting VCSEL with an integrated lens. In an example, a backside emitting VCSEL may be a VCSEL that emits light from a bottom side of the VCSEL. By utilizing a backside VCSEL instead of a VCSEL (e.g., VCSEL 110 described above), the backside VCSEL may be arranged above the silicon photonic chip 101 without a need to flip-chip mount a VCSEL 110 on an interposer (e.g., the lensed interposer 130). Further, a backside emitting VCSEL may include one or more layers of substrate with sufficient thickness to integrate additional components, on a bottom portion of the backside emitting VCSEL, such that the lens 132 may be integrated into the backside emitting VCSEL.

In some examples, the VCSEL 210 may be wire bonded to the transmission circuit 106 through a through-silicon via (TSV) 220. The lens 132 may be integrated in the VCSEL 210, and may be disposed at a location within the substrate of the VCSEL 210 where the lens center 134 may be offset from a VCSEL emission point 211, in the x-direction indicated by the coordinate system 170, by the offset 113. In some examples, the VCSEL emission point 211 may be offset from the lens center 134 but may be positioned within a diameter of the lens 132 in the x-direction. The VCSEL emission point 211 may be a point on the VCSEL 210 that emits light in the y-direction indicated by the coordinate system 170. In some examples, the VCSEL 210 may emit light from the emission point 211 in the y-direction, at a normal angle with respect to the VCSEL 210, towards the lens 132. By offsetting the lens center 134 from the VCSEL emission point 211 in the x-direction, light emitted from the VCSEL emission point 211 in the y-direction may incident on a portion, or a point, of the lens 132, at a normal angle to the portion of the lens 132, where the point may be outside of the lens center 134. As such, the emitted light being incident on the point outside of the lens center 134 may be collimated and refracted by the lens 132 at an off-normal refraction angle from the lens 132. The lens 132 may refract and/or collimate the light emitted from the VCSEL 210 such that the light emitted from the VCSEL 210 may be directed towards the coupler 125 at an incident angle. The incident angle may be based on a distance (e.g., offset 113) between the VCSEL emission point 211 and the lens center 134, attributes of the lens 132 (e.g., thickness, radius, diameter, shape, curvature, material), and/or other attributes associated with the VCSEL 210, the light emitted from the VCSEL 210, and/or the lens 132.

In an example shown in FIG. 3, a beam among the light emitted by a VCSEL (VCSEL 110 or VCSEL 210) may be refracted by the lens 132 and may be directed towards the coupler 125, such that the beam couples onto the coupler 125 at an incident angle θ that may be off-normal from the coupler 125. The refracted beam may be coupled onto the coupler 125 at a position that offsets from the point in which the beam leaves the lens 132. The refraction from the lens 132 may cause the beam to be coupled to the coupler 125 at the incident angle θ. In some examples, a distance between the lens 132 and the waveguide 104 may range from almost touching (e.g., 1 micron) to several millimeters. For example, when the distance from the VCSEL emission point to a lens surface (e.g., a top surface of the lens that is away from the lens center) is 100 microns, the lens radius of curvature is 110 microns, and the offset 113 is approximately 14 microns from the lens center 134, an exit angle of the light exiting the lens 132 may be approximately 8 degrees. The angle of the light exiting the VCSEL/lens pair may be a function of the offset 113 and tangent of the offset 113 divided by the distance between the VCSEL 113 and the lens 132.

Other applications and/or devices that may use the structure in accordance with the present disclosure may include biosensors. In an example, when the structure 120 or the structure 200 is used in biosensors applications and devices, power consumption by the biosensors may be reduced due to the use of VCSEL instead of high power lasers. Further, the lensed interposer 130 may act as an optoelectronic (OE) building block, such that an array of OEs may be bonded to an interposer, tested and burned-in (for high reliability) prior to bonding to a photonic chip. Furthermore, a light source module that uses an edge emitting DFB laser along with other components to collimate light may require a high precision alignment and bonding process, which may be more expensive than a single lensed VCSEL or a VCSEL mounted on a lens interposer as described in the present disclosure. Contrary to edge emitting lasers, VCSELs can be tested at several stages throughout a production process to check for material quality and processing issues.

Figure 4:
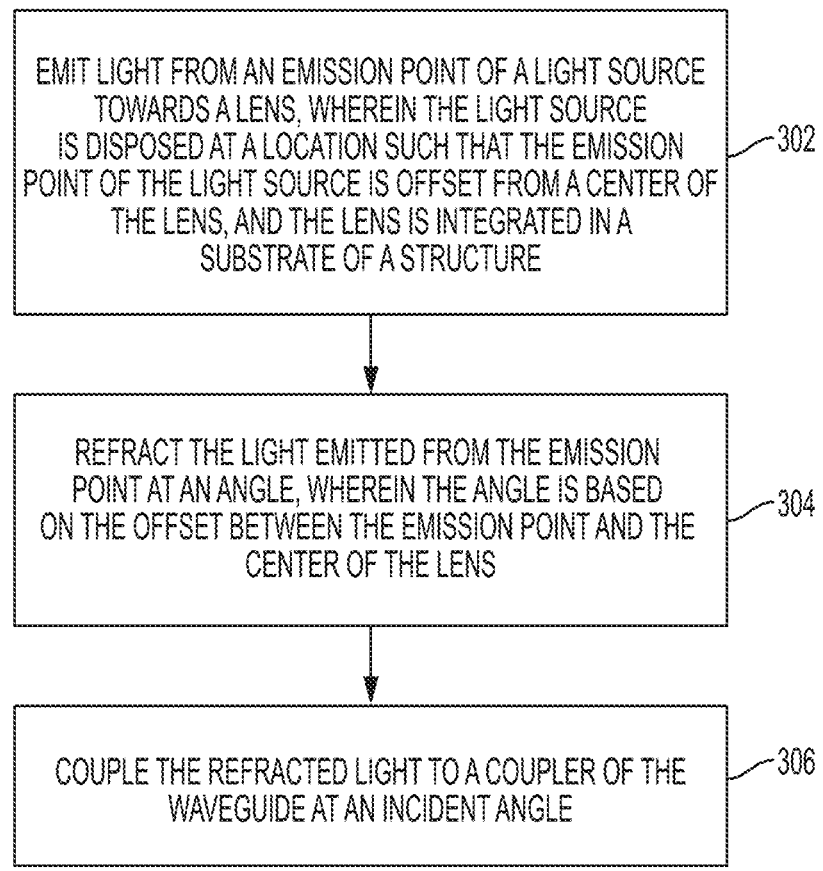
FIG. 4 illustrates a flow diagram relating to a process to implement photonic waveguide coupling using offset light source in one embodiment.

FIG. 4 illustrates a flow diagram relating to a process to implement photonic waveguide coupling using offset light source, arranged in accordance with at least some embodiments presented herein. The process in FIG. 4 may be implemented using, for example, computer system 100 discussed above. An example process may include one or more operations, actions, or functions as illustrated by one or more of blocks 302, 304, and/or 306. Although illustrated as discrete blocks, various blocks may be divided into additional blocks, combined into fewer blocks, eliminated, or performed in parallel, depending on the desired implementation.

At block 302, a light source may emit light from an emission point of the light source towards a lens. The light source may be disposed at a location such that the emission point of the light source is offset from a center of the lens. The lens may be integrated in a substrate of a structure. In some examples, the light source may be a vertical-cavity surface-emitting laser. In some examples, the light source may be mounted above a lensed interposer comprising the substrate. In some examples, the light source may be flip-chip mounted above the lensed interposer. In some examples, the light source may be a backside emitting vertical-cavity surface-emitting laser. In some examples where the substrate is part of the backside emitting vertical-cavity surface-emitting laser, the lens may be integrated in the backside emitting vertical-cavity surface-emitting laser. In some examples, the light source may be a photodiode.

The process may continue from block 302 to block 304. At block 304, the lens may refract the light emitted from the emission point of the light source at an angle. The angle may be based on the offset between the emission point and the center of the lens.

The process may continue from block 34 to block 306. At block 306, the structure may couple the refracted light to a coupler of a waveguide at an incident angle. The incident angle may be an off-normal angle.

In an example, a first structure in accordance with the present disclosure may be fabricated by disposing a light source, such as a VCSEL, at a first location, where the first location may be above an interposer. The fabrication of the first structure may further include disposing the interposer above a waveguide. The fabrication of the first structure may further include disposing a lens at a second location, where the second location may be within a substrate of the interposer. The first location of the light source may be a location in which an emission point of the light source is offset from a center of the lens disposed at the second location. The offset of the emission point from the center of the lens may be a separation in a horizontal direction (e.g., the x-direction indicated by the coordinate system 170 above). In some examples, the interposer may be a lensed interposer including an array of lenses, such that the lens integrated in the substrate of the interposer maybe among the array of lenses. The offset of the emission point from the center of the lens may cause light emitted from the light source to incident on a point of the lens, where the point may be different from, or outside of, the center of the lens. The light incident on the point of the lens may be refracted by the lens at an off-normal refraction angle. The refracted light may be directed towards a coupler of the waveguide. The refracted light may be incident on the coupler at an off-normal angle with respect to the coupler, in order to couple the refracted light onto the waveguide.

In another example, a second structure in accordance with the present disclosure may be fabricated by disposing a light source, such as a backside emitting VCSEL, at a first location, where the first location may be above a waveguide. The fabrication of the second structure may further include disposing a lens at a second location, where the second location may be within a substrate of the light source. The first location of the light source may be a location in which an emission point of the light source is offset from a center of the lens disposed at the second location. The offset of the emission point from the center of the lens may be a separation in a horizontal direction (e.g., the x-direction indicated by the coordinate system 170 above). The offset of the emission point from the center of the lens may cause light emitted from the light source to incident on a point of the lens, where the point may be different from, or outside of, the center of the lens. The light incident on the point of the lens may be refracted by the lens at an off-normal refraction angle. The refracted light may be directed towards a coupler of the waveguide. The refracted light may be incident on the coupler at an off-normal angle with respect to the coupler, in order to couple the refracted light onto the waveguide.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A structure comprising:
   a lens integrated in a substrate; and
   a light source operable to emit light from an emission point towards the lens, wherein:
     the light source is a vertical-cavity surface-emitting laser;
     the light source is disposed at a location in which the emission point is offset from a center of the lens; and
     the offset of the emission point from the center of the lens causes the light emitted from the light source to refract at an angle to direct the light towards a coupler of a waveguide and to couple the light to the waveguide at an incident angle.

2. The structure of claim 1, wherein the substrate is a lensed interposer, and the light source is mounted above the lensed interposer.

3. The structure of claim 2, wherein the light source is flip-chip mounted above the lensed interposer.

4. The structure of claim 1, wherein the light source is a backside emitting vertical-cavity surface-emitting laser.

5. The structure of claim 4, wherein the substrate is a part of the backside emitting vertical-cavity surface-emitting laser such that the lens is integrated in the light source.

6. A structure comprising:
   a lens integrated in a substrate comprising a lensed interposer; and
   a light detector operable to absorb light, wherein:
     the light detector is disposed at a location in which a center of the light detector is offset from a center of the lens;
     the lens is disposed between the light detector and a waveguide coupler;
     the lens is operable to direct the light exiting the waveguide coupler towards the center of the light detector;
     the light detector is further operable to:
       absorb the light directed by the lens; and convert the absorbed light into electric current, wherein the lensed interposer comprises a transimpedance amplifier operable to amplify the electric current.

7. The structure of claim 6, wherein the light detector is a photodiode.

8. The structure of claim 6, wherein the light detector is mounted above the lensed interposer.

9. A device comprising:
a modulator;
a circuit configured to:
  receive an electrical signal;
  send the electrical signal to the modulator;
a waveguide comprising a coupler;
a structure comprising:
  a lens integrated in a substrate; and
  a light source, wherein:
    the light source is operable to emit light from an emission point towards the lens;
    the light source is disposed at a location where the emission point is offset from a center of the lens; and
    the offset of the emission point from the center of the lens causes the light emitted from the light source to refract at an angle to direct the light towards the coupler of the waveguide and to couple the light to the waveguide at an incident angle;
wherein the waveguide is effective to direct the coupled light to the modulator, the modulator is configured to modulate the electrical signal with the light received from the waveguide.

10. The device of claim 9, wherein the light source is a vertical-cavity surface-emitting laser.

11. The device of claim 9, wherein the substrate is a lensed interposer, and the light source is mounted above the lensed interposer.

12. The device of claim 11, wherein the light source is flip-chip mounted above the lensed interposer.

13. The device of claim 9, wherein the light source is a backside emitting vertical-cavity surface-emitting laser.

14. The device of claim 13, wherein the substrate is a part of the backside emitting vertical-cavity surface-emitting laser such that the lens is integrated in the light source.

15. The device of claim 9, wherein:
the structure is a first structure;
the lens is a first lens;
the waveguide is a first waveguide;
the coupler is a first coupler;
the substrate is a first substrate; and
the device further comprises a second structure, the second structure comprises:
  a second lens integrated in a second substrate; and
  a light detector operable to absorb light, wherein:
    the light detector is disposed at a location in which a center of the light detector is offset from a center of the second lens;
    the second lens is disposed between the light detector and a second waveguide comprising a second coupler;
    the second lens is operable to direct the light exiting the waveguide coupler towards the center of the light detector;
  the light detector is further operable to:
    absorb the light directed by the second lens; and
    convert the absorbed light into electric current.

16. The device of claim 15, wherein the light detector is a photodiode.

17. The device of claim 15, wherein the substrate is a lensed interposer, and the light detector is mounted above the lensed interposer.

18. The device of claim 17, wherein the lensed interposer comprises a transimpedance amplifier operable to amplify the electric current.

* * * * *